(12) United States Patent
Zhang et al.

(10) Patent No.: US 11,522,373 B2
(45) Date of Patent: Dec. 6, 2022

(54) TERMINAL AND BATTERY CHARGING CONTROL DEVICE AND METHOD THEREOF

(71) Applicant: GUANGDONG OPPO MOBILE TELECOMMUNICATIONS CORP., LTD., Guangdong (CN)

(72) Inventors: Jialiang Zhang, Dongguan (CN); Kewei Wu, Dongguan (CN); Jun Zhang, Dongguan (CN); Fuchun Liao, Dongguan (CN); Yuanxiang Hu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 139 days.

(21) Appl. No.: 15/900,281

(22) Filed: Feb. 20, 2018

(65) Prior Publication Data

US 2018/0175659 A1 Jun. 21, 2018

Related U.S. Application Data

(63) Continuation of application No. 15/115,045, filed as application No. PCT/CN2014/076974 on May 7, 2014, now Pat. No. 9,935,490.

(30) Foreign Application Priority Data

Jan. 28, 2014 (CN) .......................... 201410042541.0

(51) Int. Cl.
*H02J 7/00* (2006.01)
*H02J 7/14* (2006.01)

(52) U.S. Cl.
CPC ........ *H02J 7/00308* (2020.01); *H02J 7/0031* (2013.01); *H02J 7/00034* (2020.01); *H02J 7/00302* (2020.01); *H02J 7/00304* (2020.01)

(58) Field of Classification Search
CPC ....... Y02E 60/12; H02J 7/0042; H02J 7/0045; H02J 7/027; H02J 7/045; H02J 7/0031;
(Continued)

(56) References Cited

U.S. PATENT DOCUMENTS 3,927,361 A 12/1975 Macharg
5,229,705 A 7/1993 Kato
(Continued)

FOREIGN PATENT DOCUMENTS

CN 1163500 A 10/1997
CN 1989675 A 6/2007
(Continued)

OTHER PUBLICATIONS

Indian Patent Application No. 201637028337, Office Action dated Aug. 5, 2019, 6 pages.
(Continued)

*Primary Examiner* — Alexis B Pacheco
(74) *Attorney, Agent, or Firm* — Lathrop GPM LLP

(57) ABSTRACT

The present disclosure relates to the technical field of charging. A terminal and a battery charging control device and method are provided. The battery charging control device including a battery connector, a main control circuit and a quick charging switch circuit is adopted. During the regular charging or the quick charging, the main control circuit performs a data communication with the external power adapter via the communication interface, and obtains a charging voltage and a charging current for the battery; if the charging voltage is greater than a voltage threshold and/or the charging current is greater than a current threshold, the main control circuit sends a charging switch-off instruction, such that the controller controls the communication interface to switch off; if the charging voltage is less than or equal to the voltage threshold and the charging
(Continued)

current is less than or equal to the current threshold, the main control circuit continues to obtain the charging voltage and the charging current.

17 Claims, 3 Drawing Sheets

(58) Field of Classification Search
CPC ....... H02J 2007/0096; H02J 2007/0039; H02J 2007/0037; H01M 10/44; H01M 10/46
USPC .......................................................... 320/107
See application file for complete search history.

(56) References Cited

U.S. PATENT DOCUMENTS

| | | | |
|---|---|---|---|
| 5,254,931 A * | 10/1993 | Martensson | H02J 7/008 320/160 |
| 5,541,489 A | 7/1996 | Dunstan | |
| 5,600,230 A * | 2/1997 | Dunstan | H02J 7/0047 340/636.13 |
| 5,905,362 A | 5/1999 | Nagano et al. | |
| 6,025,695 A | 2/2000 | Friel et al. | |
| 6,501,249 B1 | 12/2002 | Drori | |
| 2001/0006338 A1* | 7/2001 | Yamashita | H02J 7/0086 320/160 |
| 2005/0062459 A1* | 3/2005 | Young | H02J 7/0031 320/134 |
| 2005/0077878 A1 | 4/2005 | Carrier et al. | |
| 2005/0174094 A1 | 8/2005 | Purdy et al. | |
| 2007/0007822 A1 | 1/2007 | Cioaca et al. | |
| 2007/0118272 A1 | 5/2007 | Shimada et al. | |
| 2007/0188134 A1* | 8/2007 | Hussain | H02J 7/007182 320/114 |
| 2008/0224667 A1 | 9/2008 | Tanaka et al. | |
| 2008/0231236 A1 | 9/2008 | Watanabe et al. | |
| 2008/0238370 A1 | 10/2008 | Carrier et al. | |
| 2009/0135633 A1 | 5/2009 | Ikeuchi et al. | |
| 2009/0167252 A1 | 7/2009 | Abe | |
| 2009/0184688 A1 | 7/2009 | Kim | |
| 2010/0033139 A1* | 2/2010 | An | H02J 7/0086 320/163 |
| 2010/0165528 A1* | 7/2010 | Chan | H04L 12/40045 361/86 |
| 2010/0188237 A1 | 7/2010 | Monks et al. | |
| 2010/0253291 A1 | 10/2010 | Lin | |
| 2011/0006739 A1* | 1/2011 | Chishima | H04W 52/0261 320/136 |
| 2011/0057605 A1 | 3/2011 | Chung et al. | |
| 2011/0057620 A1 | 3/2011 | Tsai et al. | |
| 2012/0038317 A1 | 2/2012 | Miyamoto et al. | |
| 2012/0139478 A1* | 6/2012 | Wu | H02J 7/00 320/107 |
| 2013/0002200 A1* | 1/2013 | Kobayashi | H02J 7/045 320/112 |
| 2013/0007336 A1 | 1/2013 | Chun et al. | |
| 2013/0063088 A1* | 3/2013 | Kim | B60L 53/14 320/109 |
| 2013/0069600 A1 | 3/2013 | Knowlton | |
| 2013/0073777 A1* | 3/2013 | Monks | G06F 13/4291 710/316 |
| 2013/0082662 A1 | 4/2013 | Carre et al. | |
| 2013/0154547 A1* | 6/2013 | Wada | H02J 7/00 320/107 |
| 2013/0207592 A1* | 8/2013 | Okada | H02J 7/00 320/149 |
| 2013/0314830 A1* | 11/2013 | Zamprogno | H02H 3/207 361/86 |
| 2014/0009120 A1* | 1/2014 | Kim | H02J 7/0068 320/138 |
| 2014/0097788 A1* | 4/2014 | Kim | H02J 7/00714 320/137 |
| 2014/0181541 A1 | 6/2014 | Matsumoto | |
| 2014/0313794 A1 | 10/2014 | Ono et al. | |
| 2015/0263549 A1* | 9/2015 | Lee | B60L 53/16 361/93.4 |

FOREIGN PATENT DOCUMENTS

| | | |
|---|---|---|
| CN | 101013764 A | 8/2007 |
| CN | 101714772 A | 5/2010 |
| CN | 101719685 A | 6/2010 |
| CN | 101939893 A | 1/2011 |
| CN | 102931693 A | 2/2013 |
| CN | 103236568 A | 8/2013 |
| CN | 203135543 U | 8/2013 |
| CN | 103762691 A | 4/2014 |
| CN | 103779907 A | 5/2014 |
| CN | 103795040 A | 5/2014 |
| EP | 0800253 A2 | 10/1997 |
| EP | 1455431 A2 | 9/2004 |
| EP | 1796243 A2 | 6/2007 |
| EP | 1821384 A2 | 8/2007 |
| EP | 2256897 A1 | 12/2010 |
| EP | 2618419 A2 | 7/2013 |
| GB | 2251515 A | 7/1992 |
| JP | 2003033034 A | 1/2003 |
| JP | 2007327772 A | 12/2007 |
| JP | 2008061381 A | 3/2008 |
| JP | 2010093912 A | 4/2010 |
| JP | 2010154692 A | 7/2010 |
| JP | 2013108793 A | 6/2013 |
| JP | 2013132183 A | 7/2013 |
| KR | 100544998 B1 | 1/2006 |
| KR | 1020130002970 A | 1/2013 |
| WO | WO 9905766 A1 | 2/1999 |
| WO | WO 2007043250 A1 | 4/2007 |
| WO | WO 2013031589 A1 | 3/2013 |
| WO | WO 2013073173 A1 | 5/2013 |

OTHER PUBLICATIONS

European Patent Application No. 19190441.6, extended Search and Opinion dated Nov. 28, 2019, 8 pages.
Korean Patent Application No. 10-2016-7023544 first Office Action dated Dec. 14, 2018, 5 pages.
Korean Patent Application No. 10-2016-7023544 English translation of first Office Action dated Dec. 14, 2018, 5 pages.
Korean Patent Application No. 10-2016-7023544 second Office Action dated Jun. 25, 2019, 4 pages.
Korean Patent Application No. 10-2016-7023544 English translation of second Office Action dated Jun. 25, 2019, 7 pages.
Mexican Patent Application No. MXa2016009854 Office Action dated Mar. 10, 2020, 5 pages.
Malaysian Patent Application No. PI2016702724 Office Action dated Jul. 31, 2019, 4 pages.
Philippine Patent Application No. 12016501486 Office Action dated Aug. 20, 2020, 5 pages.
Singapore Patent Application No. 11201606219X first Office Action dated Apr. 3, 2017, 12 pages.
Singapore Patent Application No. 11201606219X second Office Action dated Nov. 23, 2017, 5 pages.
U.S. Appl. No. 15/115,013 first non-final Office Action dated Oct. 17, 2018, 29 pages.
U.S. Appl. No. 15/115,013 first final Office Action dated Apr. 5, 2019, 23 pages.
U.S. Appl. No. 15/115,013 second non-final Office Action dated Sep. 16, 2019, 30 pages.
U.S. Appl. No. 15/115,013 second final Office Action dated Feb. 6, 2020, 31 pages.
U.S. Appl. No. 15/115,013 third non-final Office Action dated Jun. 22, 2020, 24 pages.
PCT/CN2015/070468 International Search Report and Written Opinion dated Apr. 13, 2015, 13 pages.
PCT/CN2015/070468 English translation of International Search Report and Written Opinion dated Apr. 13, 2015, 8 pages.

(56) References Cited

OTHER PUBLICATIONS

European Patent Application No. 19190441.6 Office Action dated Aug. 5, 2020, 4 pages.
Chinese Patent Application No. 201580005233.3 first Office Action dated Aug. 30, 2018, 7 pages.
Chinese Patent Application No. 201580005233.3 English translation of first Office Action dated Aug. 30, 2018, 7 pages.
Chinese Patent Application No. 201580005233.3 second Office Action dated Apr. 15, 2019, pages.
Chinese Patent Application No. 201580005233.3 English translation of second Office Action dated Apr. 15, 2019, 8 pages.
European Patent Application No. 15743390.5 extended Search and Opinion dated Sep. 22, 2017, 8 pages.
European Patent Application No. 15743390.5 Office Action dated Mar. 29, 2018, 4 pages.
European Patent Application No. 18209731.1 extended Search and Opinion dated Feb. 12, 2019, 8 pages.
European Patent Application No. 18209731.1 Office Action dated Sep. 30, 2019, 4 pages.
Australian Patent Application No. 2015210567 Office Action dated Aug. 7, 2017, 4 pages.
Indian Patent Application No. 201637028520 Office Action dated Dec. 31, 2018, 7 pages.
Canadian Patent Application No. 2,937,953 first Office Action dated May 31, 2017, 8 pages.
Canadian Patent Application No. 2,937,953 second Office Action dated Jan. 18, 2018, 6 pages.
Canadian Patent Application No. 2,937,953 third Office Action dated Sep. 19, 2018, 5 pages.
Canadian Patent Application No. 2,937,953 fourth Office Action dated Jul. 23, 2019, 5 pages.
Chilean Patent Application No. 201601924 first Office Action dated Sep. 21, 2017, 6 pages.
Chilean Patent Application No. 201601924 second Office Action dated Mar. 12, 2018, 8 pages.
Chinese Patent Application No. 201410042541.0 first Office Action dated Aug. 9, 2017, 4 pages.
Chinese Patent Application No. 201410042541.0 English translation of first Office Action dated Aug. 9, 2017, 5 pages.
Chinese Patent Application No. 201410042541.0 second Office Action dated Nov. 14, 2017, 4 pages.
Chinese Patent Application No. 201410042541.0 English translation of second Office Action dated Nov. 14, 2017, 4 pages.
European Patent Application No. 15744077.7 Search Report and Opinion dated Jul. 3, 2017, 6 pages.
European Patent Application No. 15744077.7 first Office Action dated May 24, 2018, 3 pages.
European Patent Application No. 15744077.7 second Office Action dated Oct. 12, 2018, 4 pages.
European Patent Application No. 15744077.7 third Office Action dated Apr. 15, 2019, 3 pages.
European Patent Application No. 15744077.7 fourth Office Action dated Dec. 16, 2019, 4 pages.
European Patent Application No. 15744077.7 fifth Office Action dated Apr. 22, 2020, 3 pages.
Indonesian Patent Application No. P00201605214 Office Action undated, 2 pages.
Indian Patent Application No. 201637028518 Office Action dated Feb. 20, 2019, 6 pages.
Japanese Patent Application No. 2016-549265 first Office Action dated Aug. 8, 2017, 4 pages.
Japanese Patent Application No. 2016-549265 English translation of first Office Action dated Aug. 8, 2017, 5 pages.
Japanese Patent Application No. 2016-549265 second Office Action dated Oct. 31, 2017, 4 pages.
Japanese Patent Application No. 2016-549265 English translation of second Office Action dated Oct. 31, 2017, 5 pages.
Chinese Patent Application No. 201810220714.1, Office Action dated Nov. 17, 2020, 20 pages.
Chinese Patent Application No. 201810220714.1, English translation of Office Action dated Nov. 17, 2020, 20 pages.
U.S. Appl. No. 15/115,013 Final Office Action dated Dec. 22, 2020, 25 pages.
U.S. Appl. No. 15/989,363 Final Office Action dated Nov. 19, 2020, 11 pages.
U.S. Appl. No. 15/989,363, Office Action dated Apr. 23, 2021, 11 pages.
U.S. Appl. No. 15/115,013, Office Action dated May 14, 2021, 14 pages.
European Patent Application No. 19190441.6, Office Action dated Jun. 9, 2021, 4 pages.
Chinese Patent Application No. 201810220714.1, Office Action dated Jun. 29, 2021, 18 pages.
Chinese Patent Application No. 201810220714.1, English translation of Office Action dated Jun. 29, 2021, 31 pages.
European Patent Application No. 15744077.7, Office Action dated Jul. 5, 2021, 4 pages.
European Patent Application No. 19190441.6, Office Action dated Jan. 24, 2022, 5 pages.
U.S. Appl. No. 15/989,363, Office Action dated Feb. 15, 2022, 12 pages.
Brazilian Patent Application No. 112016016943-3, Office Action dated Dec. 15, 2021, 3 pages.
Brazilian Patent Application No. 112016016943-3, English translation of Office Action dated Dec. 15, 2021, 3 pages.
U.S. Appl. No. 16/572,071, Office Action dated May 27, 2022, 24 pages.
Chinese Patent Application No. 201810220714.1, Office Action dated Mar. 22, 2022, 22 pages.
Chinese Patent Application No. 201810220714.1, English translation of Office Action dated Mar. 22, 2022, 22 pages.
Indian Patent Application No. 201637028337, Office Action dated Jul. 27, 2022, 2 pages.
European Patent Application No. 19190441.6, Office Action dated Aug. 24, 2022, 3 pages.

* cited by examiner

TERMINAL AND BATTERY CHARGING CONTROL DEVICE AND METHOD THEREOF

CROSS-REFERENCE TO RELATED APPLICATIONS

This application is a continuing application of a U.S. application Ser. No. 15/115,045 filed Jul. 28, 2016, which is a National Phase Application of International Application No. PCT/CN2014/076974, filed on May 7, 2014, which is based on and claims priority to Chinese Patent Application No. 201410042541.0, filed on Jan. 28, 2014, the entire contents of which are incorporated herein by reference.

TECHNICAL FIELD

The present disclosure generally relates to the charging technical field, and more particularly, to a terminal and a battery charging control device and method.

BACKGROUND

Currently, a battery of a terminal is typically charged by connecting a communication interface of the terminal with an external power adapter. However, in the related art, in order to reduce charging time during charging the battery, the charging current may be enhanced for performing a quick charging on the battery. However, whether the battery is charged in a conventional constant voltage mode or with increased charging current, if a charging current and/or charging voltage for the battery is too high during the charging, the battery will be damaged due to overvoltage and/or overcurrent charging. Therefore, in the related art, an overcurrent protection and/or an overvoltage protection cannot be realized for the battery during performing a regular charging or quick charging on the battery of the terminal.

SUMMARY

At least one embodiment of the present disclosure is to provide a battery charging control device, and to solve a problem in the related art that an overcurrent protection and/or an overvoltage protection cannot be realized for a battery during performing a regular charging or quick charging on the battery of a terminal.

An embodiment of the present disclosure is realized as follows. There is provided a battery charging control device. The battery charging control device includes a battery connector coupled to a battery of a terminal, and a main control circuit coupled between the battery connector and a communication interface of the terminal. The main control circuit is configured to perform a data communication to acquire a charging voltage and/or a charging current for the battery, and to send a charging switch-off instruction to switch the communication interface off when the charging voltage is greater than a voltage threshold and/or the charging current is greater than a current threshold.

An embodiment of the present disclosure is to provide a terminal, including a communication interface, a battery and a battery charging control device described above.

An embodiment of the present disclosure is to provide a battery charging control method based on the battery charging control device described above. The battery charging control method can include following: obtaining a charging voltage and/or a charging current for a battery of the terminal through a communication interface of the terminal; and switching the communication interface off when the charging voltage is greater than a voltage threshold and/or the charging current is greater than a current threshold.

DETAILED DESCRIPTION

To make the objectives, the technical solutions, and the advantages of embodiments of the present disclosure clearer, the technical solutions in embodiments of the present disclosure are hereinafter described clearly and completely with reference to the accompanying drawings in embodiments of the present disclosure. It should be understood that, the specific embodiments described herein are merely used for explanation, but not used to limit the present disclosure.

In the present disclosure, a charging includes a regular charging and a quick charging, such that there may be two charging modes, which are a regular charging mode and a quick charging mode. The quick charging mode may be referred to as a first charging mode and the regular charging mode may be referred to as a second charging mode. Under the regular charging mode, the power adapter outputs a relatively small current (typically less than 2.5 A) or charges the battery in a terminal with a relatively small power (typically less than 15 W). While, under the quick charge mode, the power adapter outputs a relatively large current (typically greater than 2.5 A, such as 4.5 A, 5 A or higher) or charges the battery in the terminal with a relatively large power (typically greater than or equal to 15 W), compared to the regular charging mode. In the regular charging mode, it may take several hours to fully fill a larger capacity battery (such as a battery with 3000 mAh), while in the quick charging mode, the period of time may be significantly shortened when the larger capacity battery is fully filled, and the charging is faster.

Figure 1:
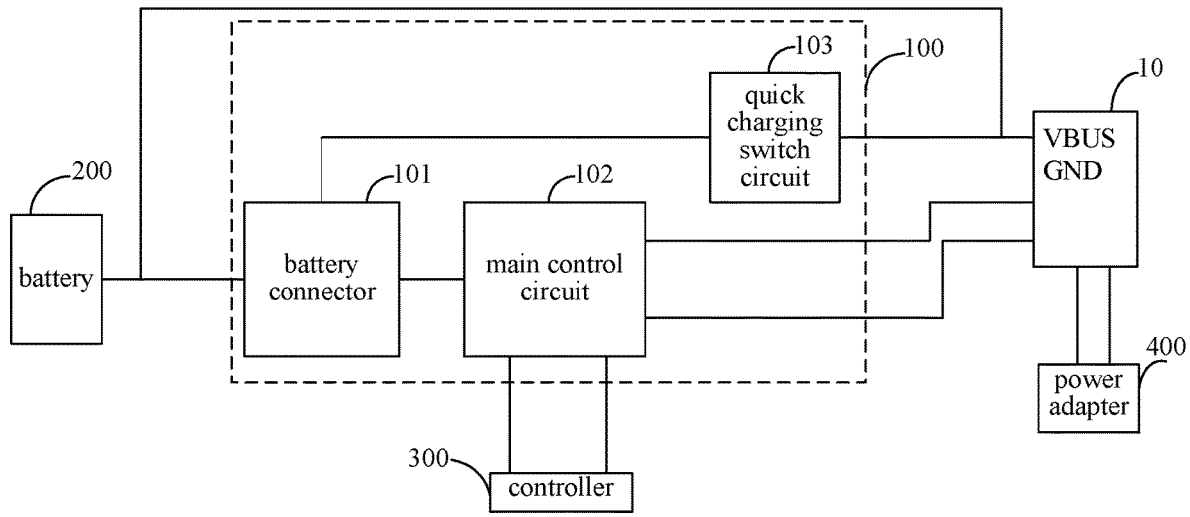
FIG. 1 is a block diagram of a battery charging control device according to an embodiment of the present disclosure.

FIG. 1 illustrates a block diagram of a battery charging control device according to an embodiment of the present disclosure. For illustration purposes, only parts related to embodiments of the present disclosure are shown, which will be described in detail in the following.

The battery charging control device 100 provided in embodiments of the present disclosure is coupled with a battery 200 and a controller 300 in a terminal respectively. The battery 200 is charged by obtaining direct current from a power providing device, such as an external power adapter 400 via a communication interface 10 of the terminal. The controller 300 controls the communication interface 10 of the terminal to switch on or off.

In the present disclosure, the power providing device is a device configured to provide power. The power providing device may be a power adapter, a power charger or the like.

The battery charging control device 100 includes a battery connector 101, a main control circuit 102 and a quick charging switch circuit 103. The battery connector 101 is coupled with an electrode of the battery 200. The main control circuit 102 is coupled with the battery connector 101. A first switch control terminal and a second switch control terminal of the main control circuit 102 are coupled with a first controlled terminal and a second controlled terminal of the quick charging switch circuit 103 respectively. Both a first communication terminal and a second communication terminal of the main control circuit 102 are coupled with the communication interface 10 of the terminal. The main control circuit 102 is also coupled with the controller 300 of the terminal. An input terminal of the quick charging switch circuit 103 is coupled with a power wire VBUS of the communication interface 10 of the terminal, and an output terminal of the quick charging switch circuit 103 is coupled with the battery connector 101.

When a regular charging is performed on the battery 200, the main control circuit 102 controls the quick charging switch circuit 103 to switch off. When a quick charging is performed on the battery 200, the main control circuit 102 controls the quick charging switch circuit 103 to switch on, and direct current is introduced into the quick charging switch circuit 103 via the communication interface 10 of the terminal for charging the battery 200 via the battery connector 101, such that the charging current for the battery 200 is increased, and thus quick charging is realized.

During the above regular charging or quick charging, the main control circuit 102 performs a data communication with the power adapter 400 via the communication interface 10 of the terminal, and obtains a charging voltage and a charging current for the battery 200. If the above charging voltage is greater than a voltage threshold and/or the above charging current is greater than a current threshold, the main control circuit 102 sends a charging switch-off instruction, such that the controller 300 controls the communication interface 10 of the terminal to switch off. If the above charging voltage is less than or equal to the voltage threshold and the above charging current is less than or equal to the current threshold, the main control circuit 102 continues to obtain the charging voltage and the charging current.

Figure 2:
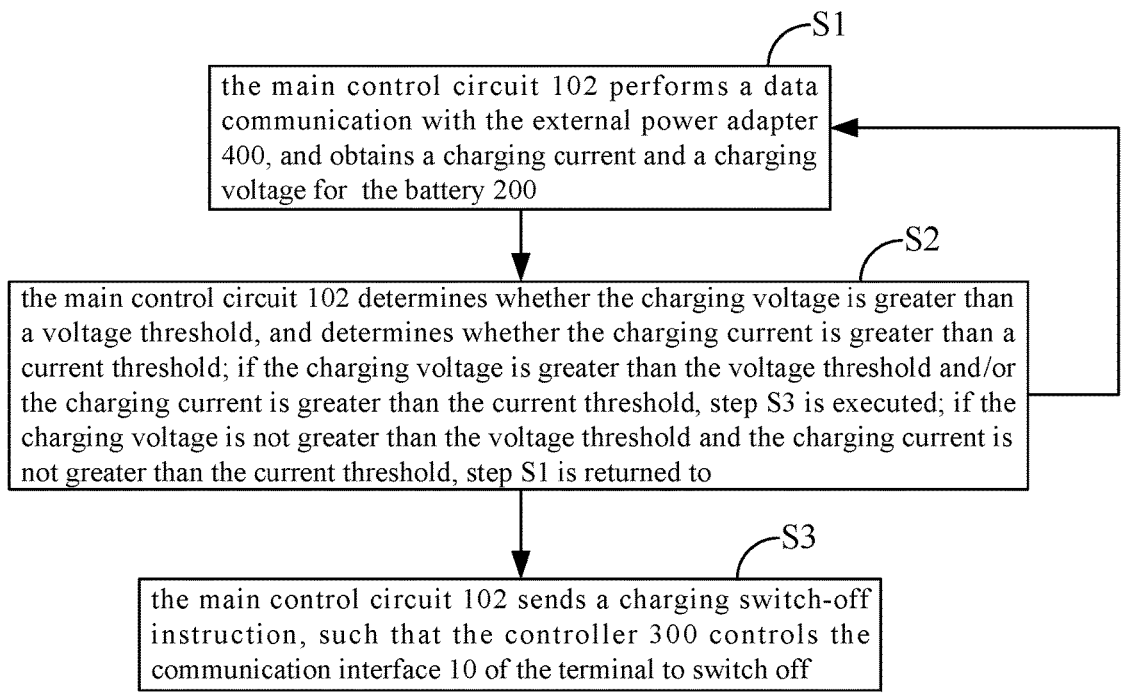
FIG. 2 is a flow chart of a battery charging control method based on a battery charging control device shown in FIG. 1.

Based on the battery charging control device 100 shown in FIG. 1, embodiments of the present disclosure may further provide a battery charging control method. As shown in FIG. 2, the battery charging control method includes following acts.

In block S1, the main control circuit 102 performs a data communication with the external power adapter 400, and obtains the charging current and the charging voltage for the battery 200.

In block S2, the main control circuit 102 determines whether the charging voltage is greater than the voltage threshold, and determines whether the charging current is greater than the current threshold. If the charging voltage is greater than the voltage threshold and/or the charging current is greater than the current threshold, block S3 is executed. If the charging voltage is less than or equal to the voltage threshold and the charging current is less than or equal to the current threshold, block S1 is returned to.

In block S3, the main control circuit 102 sends a charging switch-off instruction, such that the controller 300 controls the communication interface 10 of the terminal to switch off.

In an embodiment, block S1 specifically includes following acts.

The main control circuit 102 sends a charging parameter obtaining request to the power adapter 400.

The power adapter 400 feeds back charging voltage information and charging current information to the main control circuit 102 according to the charging parameter obtaining request.

The main control circuit 102 obtains the charging current and the charging voltage for the battery 200 from the above charging current information and charging voltage information.

Figure 3:
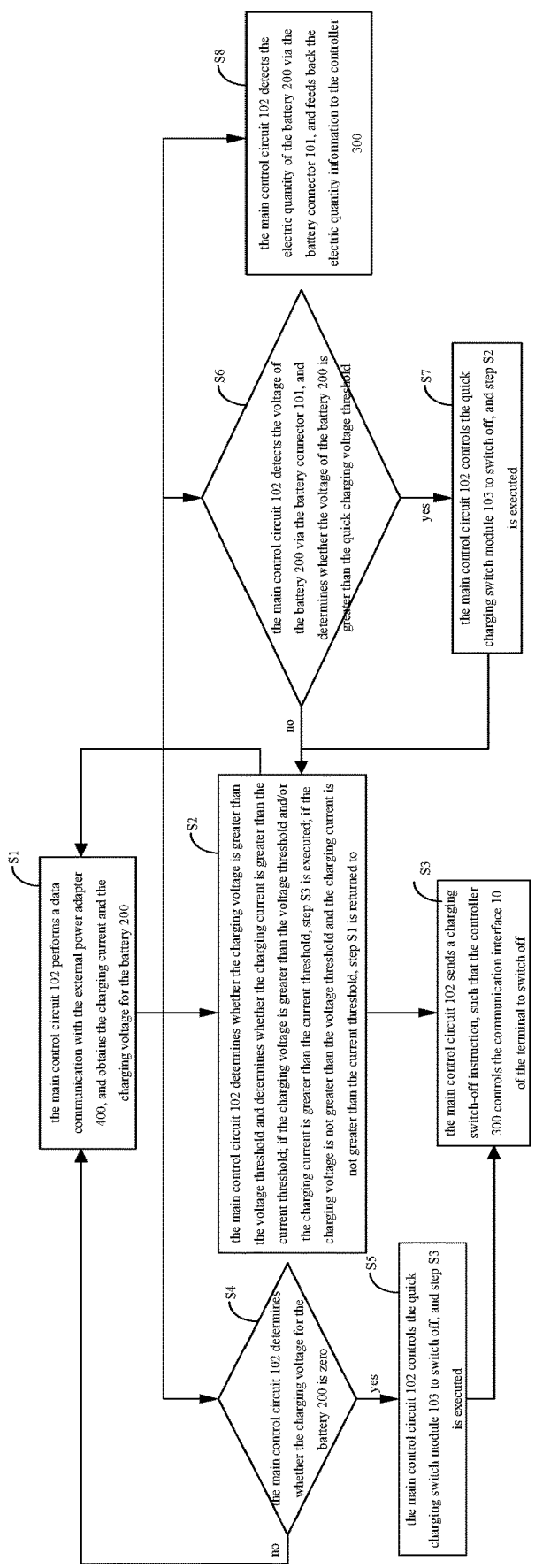
FIG. 3 is another flow chart of a battery charging control method based on a battery charging control device shown in FIG. 1.

When the quick charging is performed on the battery 200, following acts may be included (as shown in FIG. 3) after block S1, so as to switch off the quick charging process and the communication interface 10 of the terminal in time if the power adapter 400 is suddenly decoupled from the communication interface 10 of the terminal.

In block S4, the main control circuit 102 determines whether the charging voltage for the battery 200 is zero, if yes, block S5 is executed, and if no, block S1 is returned to.

In block S5, the main control circuit 102 controls the quick charging switch circuit 103 to switch off, and block S3 is executed.

When the quick charging is performed on the battery 200, the controller 300 may feedback a quick charging switch-off instruction to the main control circuit 102 at an abnormal battery temperature if the terminal has a function of detecting a temperature of the battery, such that the main control circuit 102 may control the quick charging switch circuit 103 to switch off according to the quick charging switch-off instruction.

When the quick charging is performed on the battery 200, following acts may be included (as shown in FIG. 3) after block S1, such that it can switch back to the convention charging process after completing the quick charging process.

In block S6, the main control circuit 102 detects the voltage of the battery 200 via the battery connector 101, and determines whether the voltage of the battery 200 is greater than the quick charging voltage threshold (e.g. 4.35V), if yes, block S7 is executed, and if no, block S2 is executed.

In block S7, the main control circuit 102 controls the quick charging switch circuit 103 to switch off, and then block S2 is executed.

When the quick charging is performed on the battery 200, the main control circuit 102 may also detect the electric quantity of the battery 200 via the battery connector 101, and feedback the electric quantity information to the controller 300 of the terminal, such that the terminal displays the electric quantity of the battery 200. Thus, the battery charging control method may further include following acts executed simultaneously with block S6.

In block S8, the main control circuit 102 detects the electric quantity of the battery 200 via the battery connector 101 and feeds back the electric quantity information to the controller 300.

Figure 4:
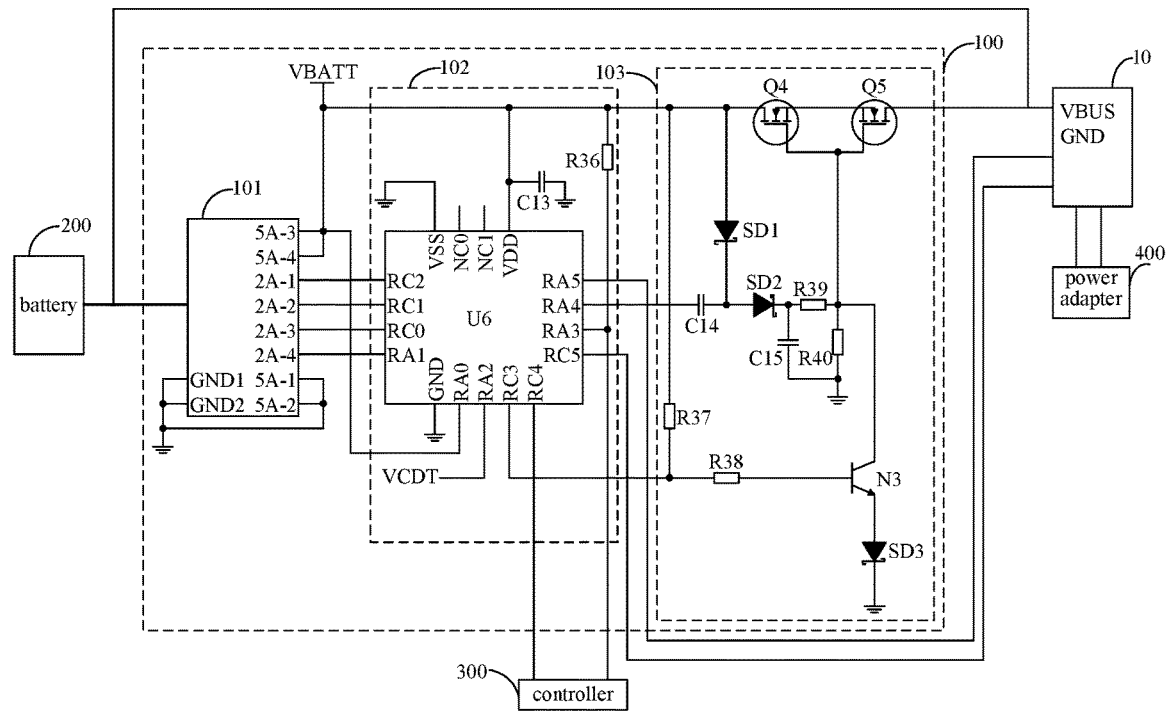
FIG. 4 is a schematic circuit diagram of a battery charging control device according to an embodiment of the present disclosure.

FIG. 4 shows a schematic circuit diagram of a battery charging control device according to an embodiment of the present disclosure. For illustration purposes, only parts related to embodiments of the present disclosure are shown, which will be described in detail in the following.

The main control circuit 102 includes a main controller U6, a thirteenth capacitor C13 and a thirty-sixth resistor R36.

A first pin 5A-1 and a second pin 5A-2 of the battery connector 101 are commonly grounded. A first ground pin GND1 and a second ground pin GND 2 of the battery connector 101 are commonly grounded. A first input/output pin RA0 of the main controller U6 is coupled with a seventh pin 5A-3 and an eighth pin 5A-4 of the battery connector 101 respectively. A second input/output pin RA1, a seventh input/output pin RC0, an eighth input/output pin RC1 and a ninth input/output pin RC2 of the main controller U6 are coupled with a sixth pin 2A-4, a fifth pin 2A-3, a fourth pin 2A-2 and a third pin 2A-1 of the battery connector 101 respectively. Each of an analog ground pin VSS and a ground pin GND of the main controller U6 is grounded. Both a first vacant pin NC0 and a second vacant pin NC1 of the main controller U6 are suspended. A power pin VDD of the main controller U6 and a first terminal of the thirteenth capacitor C13 are commonly coupled with the seventh pin 5A-3 and the eighth pin 5A-4 of the battery connector 101. A fourth input/output pin RA3 and an eleventh input/output pin RC4 are coupled with the controller 300. The thirty-sixth resistor R36 is coupled between the fourth input/output pin RA3 and the power pin VDD of the main controller U6. A fifth input/output pin RA4 and a tenth input/output pin RC3 of the main controller U6 are configured as the first switch control terminal and the second switch control terminal of the main control circuit 102 respectively. A sixth input/output pin RA5 and a twelfth input/output pin RC5 of the main controller U6 are configured as the first communication terminal and the second communication terminal of the main control circuit 102 respectively. The main controller U6 may specifically be a single chip microcomputer whose model may be PIC12LF1501, PIC12F1501, PIC16LF1503, PIC16F1503, PIC16LF1507, PIC16F1507, PIC16LF1508, PIC16F1508, PIC16LF1509 or PIC16F1509.

The quick charging switch circuit 103 includes a thirty-seventh resistor R37, a fourteenth capacitor C14, a first Schottky diode SD1, a second Schottky diode SD2, a third Schottky diode SD3, a fifteenth capacitor C15, a thirty-eighth resistor R38, a thirty-ninth resistor R39, a fortieth resistor R40, a third NPN triode N3, a fourth NMOS transistor Q4 and a fifth NMOS transistor Q5.

A first terminal of the fourteenth capacitor C14 is configured as the first controlled terminal of the quick charging switch circuit 103. A common node between a first terminal of the thirty-seventh resistor R37 and a first terminal of the thirty-eighth resistor R38 is configured as the second controlled terminal of the quick charging switch circuit 103. A second terminal of the thirty-seventh resistor R37 and an anode of the first Schottky diode SD1 are commonly coupled to a source of the fourth NMOS transistor Q4. A second terminal of the thirty-eighth resistor R38 is coupled to a base of the third NPN triode N3. A second terminal of the fourteenth capacitor C14 and a cathode of the first Schottky diode SD1 are commonly coupled to an anode of the second Schottky diode SD2. A first terminal of the thirty-ninth resistor R39 and a first terminal of the fifteenth capacitor C15 are commonly coupled to a cathode of the second Schottky diode SD2. Each of a second terminal of the thirty-ninth resistor R39, a first terminal of the fortieth resistor R40, and a collector of the third NPN triode N3 is coupled to a grid of the fourth NMOS transistor Q4 and a gird of the fifth NMOS transistor Q5. A second terminal of the fortieth resistor R40 and a second terminal of the fifteenth capacitor C15 are commonly grounded. The source of the fourth NMOS transistor Q4 is configured as the output terminal of the quick charging switch circuit 103 and coupled with the seventh pin 5A-3 and the eighth pin 5A-4 of the battery connector 101. A drain of the fourth NMOS transistor Q4 is coupled with a drain of the fifth NMOS transistor Q5. A source of the fifth NMOS transistor Q5 is configured as the input terminal of the quick charging control circuit 103. An emitter of the third NPN triode N3 is coupled with an anode of the third Schottky diode SD3, and a cathode of the third Schottky diode SD3 is grounded.

For the battery charging control device shown in FIG. 4, the main controller U6 performs a data communication with the controller 300 via the fourth input/output pin RA3 and the eleventh input/output pin RC4 thereof, and transmits the voltage information and electric quantity information of the battery 200 to the controller 300. Moreover, the main controller U6 may also determine according to the voltage of the battery 200 whether a quick charging process on the battery 200 is completed, and if yes, outputs high level voltage for turning on the third NPN triode N3, so as to control the fourth NMOS transistor Q4 and the fifth NMOS transistor Q5 to switch off. During charging the battery 200, if the power adapter 400 is suddenly decoupled from the battery 200, the main controller U6 will detect that the charging voltage for the battery 200 is zero, and then output the high level voltage for turning on the third NPN triode N3 so as to control the fourth NMOS transistor Q4 and the fifth NMOS transistor Q5 to switch off, and feed back the charging switch-off instruction to the controller 300 for controlling the communication interface 10 of the terminal to switch off. In addition, if the terminal may detect the temperature of the battery 200, the controller 300 feeds back the quick charging switch-off instruction to the main controller U6 when the temperature is abnormal, and the main controller U6 outputs high level voltage according to the quick charging switch-off instruction for turning on the third NPN triode N3, such that the fourth NMOS transistor Q4 and the fifth NMOS transistor Q5 are controlled to switch off.

When the quick charging is performed on the battery 200, direct current is introduced into the quick charging switch circuit 103 via the communication interface 10 of the terminal as follows, such that the battery 200 is charged via the battery connector 101. The main controller U6 outputs high level voltage via the fifth input/output pin RA4 thereof for controlling the fourth NMOS transistor Q4 and the fifth NMOS transistor Q5 to switch on, and controls the third NPN triode N3 to switch off via the tenth input/output pin RC3 thereof, such that the direct current is introduced via the communication interface 10 of the terminal for charging the battery 200. Since the battery 200 itself has already obtained direct current from the power adapter 400 via the communication interface 10, introducing the direct current into the quick charging switch circuit 103 via the communication interface 10 of the terminal to charge the battery 200 via the battery connector 101 may increase the charging current for the battery 200, and thus the quick charging for the battery 200 is realized.

Figure 5:
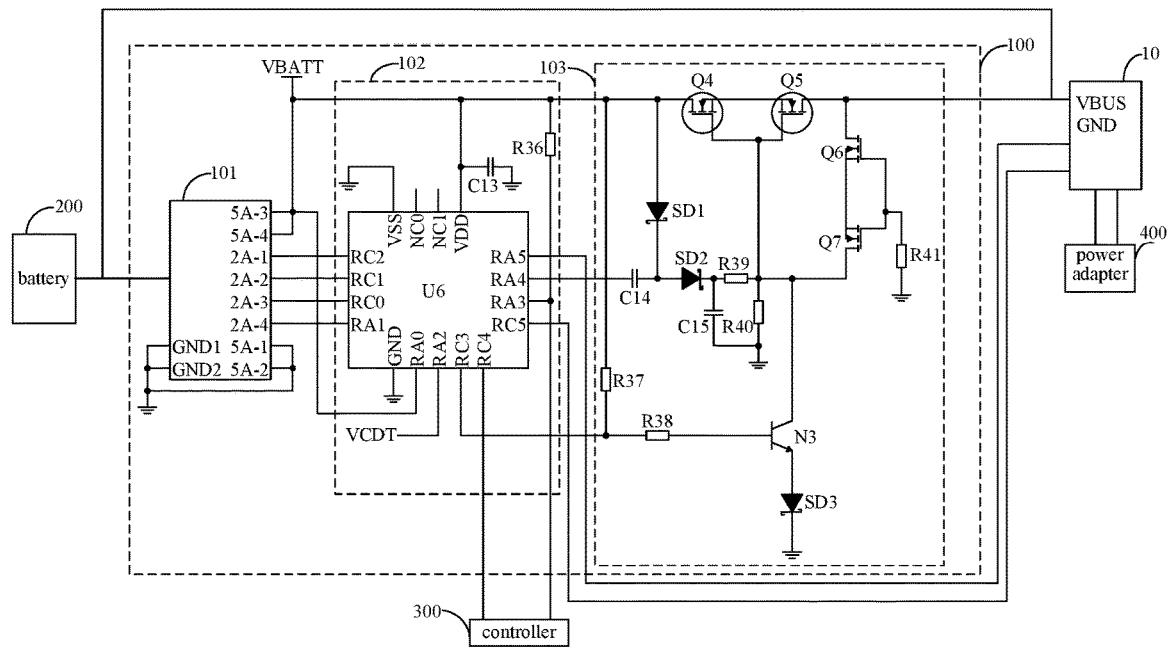
FIG. 5 is another schematic circuit diagram of a battery charging control device according to an embodiment of the present disclosure.

In addition, when the quick charging is performed on the battery 200, if the power wire VBUS and the ground wire GND of the communication interface 10 of the terminal are grounded and coupled to direct current input respectively, i.e., if a power source reversal connection occurs for the communication interface 10, the input terminal of the quick charging switch circuit 103 is grounded, and ground ends in various modules of the battery charging control device 100 are coupled to direct current, and thus in order to avoid damages to elements, as shown in FIG. 5, the quick charging switch circuit 103 may further include a sixth NMOS transistor Q6, a seventh NMOS transistor Q7 and a forty-first resistor R41. A source of the sixth NMOS transistor Q6 is coupled with the source of the fifth NMOS transistor Q5, a drain of the sixth NMOS transistor Q6 is coupled with a drain of the seventh NMOS transistor Q7, a source of the seventh NMOS transistor Q7 is coupled with the collector of the third NPN triode N3, a grid of the sixth NMOS transistor Q6 and a grid of the seventh NMOS transistor Q7 are commonly coupled to a first terminal of the forty-first resistor R41, and a second terminal of the forty-first resistor R41 is grounded.

When the above reversal connection fault occurs, the direct current is introduced from ground into the second terminal of the forty-first resistor R41 for driving the sixth NMOS transistor Q6 and the seventh NMOS transistor Q7 to switch off, such that direct current input into the battery charging control device 100 via the ground cannot form a loop, thus protecting the elements from being damaged.

Embodiments of the present disclosure also provide a terminal. The terminal includes the above communication interface 10, controller 300, battery 200 and battery charging control device 100.

In conclusion, in the present disclosure, the battery charging control device 100 including the battery connector 101, the main control circuit 102 and the quick charging switch circuit 103 is adopted. During the regular charging or the quick charging for the battery 200 in the terminal, the main control circuit 102 performs a data communication with the external power adapter 400 via the communication interface 10 of the terminal, obtains the charging voltage and the charging current for the battery 200, and sends the charging switch-off instruction if the charging voltage is greater than the voltage threshold and/or the charging current is greater than the current threshold, such that the controller 300 controls the communication interface 10 of the terminal to switch off, thus realizing the overvoltage protection and/or the overcurrent protection for the battery 200.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. A battery charging control device, coupled between a communication interface of a terminal and a battery of the terminal, the battery charging control device comprising a battery connector coupled to the battery, the battery charging control device further comprising a main control circuit coupled between the battery connector and the communication interface, and a quick charging switch circuit coupled between the battery connector and the communication interface,
wherein the quick charging switch circuit is configured to charge the battery in a first charging mode;
the main control circuit comprises two communication terminals coupled with the communication interface, and the main control circuit is configured to: obtain a value of a charging voltage and/or a value of a charging current for the battery through the communication interface by performing a data communication with an external power providing device through the two communication terminals, and
the main control circuit is configured to send a charging parameter obtaining request to the external power providing device, and to obtain the charging voltage and the charging current for the battery according to charging voltage information and charging current information fed by the external power providing device.

2. The battery charging control device according to claim 1,
wherein the main control circuit is configured to:
switch the quick charging switch circuit on when the battery is charged in the first charging mode, such that a direct current is introduced from the communication interface through both a first charging path of the first charging mode and a second charging path of a second charging mode to charge the battery, and
switch the quick charging switch circuit off when the battery is charged in the second charging mode, such that a direct current is introduced from the communication interface through the second charging path of the second charging mode to charge the battery; wherein a charging speed of the first charging mode is greater than that of the second charging mode.

3. The battery charging control device according to claim 1, wherein the main control circuit is configured to obtain a voltage value of the battery when the battery is charged in the first charging mode, and to switch the quick charging switch circuit off when the voltage value of the battery is greater than a quick charging voltage threshold.

4. The battery charging control device according to claim 1, wherein the main control circuit is configured to switch the quick charging switch circuit off in response to receiving a quick charging switch-off instruction indicating an abnormal battery temperature of the battery, when the battery is charged in the first charging mode.

5. The battery charging control device according to claim 1, wherein the main control circuit is configured to obtain an electric quantity of the battery and to feed the electric quantity to a controller of the terminal such that the electric quantity is displayed, when the battery is charged in the first charging mode.

6. The battery charging control device according to claim 1, wherein the external power providing device is an external power adapter.

7. A battery charging control method, applied to a terminal comprising a communication interface and a main control circuit having two communication terminals coupled with the communication interface, comprising:
obtaining, by the main control circuit, a value of a charging voltage and/or a value of a charging current for a battery of the terminal through the communication interface of the terminal by performing a data communication with an external power providing device through the two communication terminals, wherein the two communication terminals are coupled with a communication interface;
sending a charging parameter obtaining request to an external power providing device, when the communication interface is coupled to the external power providing device; and
obtaining the charging voltage and the charging current for the battery according to charging voltage information and charging current information fed by the external power providing device.

8. The battery charging control method according to claim 7, further comprising:
switching the quick charging switch circuit of the terminal on when the battery is charged in the first charging mode, such that a direct current is introduced from the communication interface through both a first charging path of the first charging mode and a second charging path of a second charging mode to charge the battery; and switching the quick charging switch circuit off when the battery is charged in the second charging mode, such that a direct current is introduced from the communication interface through the second charging path of the second charging mode to charge the battery; wherein a charging speed of the first charging mode is greater than that of the second charging mode.

9. The battery charging control method according to claim 7, further comprising:
obtaining a voltage value of the battery when the battery is charged in the first charging mode; and
switching the quick charging switch circuit off when the voltage value of the battery is greater than a quick charging voltage threshold.

10. The battery charging control method according to claim 7, further comprising:
switching the quick charging switch circuit off in response to receiving a quick charging switch-off instruction indicating an abnormal battery temperature of the battery, when the battery is charged in the first charging mode.

11. A terminal, comprising:
a battery;
a communication interface, comprising a power wire;
a battery connector, coupled to the battery;
a main control circuit, coupled between the battery connector and the communication interface;
a quick charging switch circuit, coupled between the battery connector and the communication interface and configured to charge the battery in a first charging mode;
wherein the main control circuit comprises two communication terminals coupled with the communication interface, and the main control circuit is configured to acquire a value of a charging voltage and/or a value of a charging current for the battery through the communication interface by performing a data communication with an external power providing device through the two communication terminals;
wherein the main control circuit is configured to perform the data communication with an external power providing device; and
the main control circuit is configured to send a charging parameter obtaining request to the external power providing device, and to obtain the charging voltage and the charging current for the battery according to charging voltage information and charging current information fed by the external power providing device.

12. The terminal according to claim 11,
wherein the main control circuit is configured to switch the quick charging switch circuit on when the battery is charged in a first charging mode, such that a direct current is introduced from the communication interface through both a first charging path of the first charging mode and a second charging path of a second charging mode to charge the battery, and switch the quick charging switch circuit off when the battery is charged in the second charging mode, such that a direct current is introduced from the communication interface through the second charging path of the second charging mode to charge the battery; wherein a charging speed of the first charging mode is greater than that of the second charging mode.

13. The terminal according to claim 11, wherein the main control circuit is configured to acquire a voltage value of the battery when the battery is charged in the first charging mode, and switch the quick charging switch circuit off when the voltage value of the battery is greater than a quick charging voltage threshold.

14. The terminal according to claim 11, wherein the main control circuit is configured to switch the quick charging switch circuit off in response to receiving a quick charging switch-off instruction indicating an abnormal battery temperature of the battery, when the battery is charged in the first charging mode.

15. The device of claim 1, wherein the main control circuit is further configured to:
send a charging switch-off instruction to switch the communication interface off when the charging voltage is greater than a voltage threshold and/or the charging current is greater than a current threshold.

16. The battery charging control method of claim 7, further comprising:
sending a charging switch-off instruction to switch the communication interface off when the charging voltage is greater than a voltage threshold and/or the charging current is greater than a current threshold.

17. The terminal of claim 11, wherein the main control circuit is further configured to: send a charging switch-off instruction to switch the communication interface off when the charging voltage is greater than a voltage threshold and/or the charging current is greater than a current threshold.

* * * * *